United States Patent
Hollins et al.

(10) Patent No.: US 8,128,106 B2
(45) Date of Patent: Mar. 6, 2012

(54) OUTBOARD MOTOR CARRIER

(75) Inventors: Bryant C. Hollins, 100 Mile House (CA); Pierre Dion, 100 Mile House (CA)

(73) Assignee: Bryant C. Hollins (CA)

(\*) Notice: Subject to any disclaimer, the term of this patent is extended or adjusted under 35 U.S.C. 154(b) by 302 days.

(21) Appl. No.: 12/508,156

(22) Filed: Jul. 23, 2009

(65) Prior Publication Data

US 2011/0020099 A1   Jan. 27, 2011

(51) Int. Cl.
*B62B 3/04* (2006.01)
*B62B 3/10* (2006.01)

(52) U.S. Cl. .................. 280/47.24; 280/47.27; 414/490

(58) Field of Classification Search ............ 280/47.131, 280/47.16, 47.17, 47.24, 47.27; 414/456, 414/462, 490; 224/309, 310
See application file for complete search history.

(56) References Cited

U.S. PATENT DOCUMENTS

| | | | |
|---|---|---|---|
| 2,484,227 A | 10/1949 | Houk et al. | |
| 2,658,703 A | 11/1953 | Brink et al. | |
| 2,745,673 A | 5/1956 | Koepke et al. | |
| 2,842,274 A | 7/1958 | Sherman | |
| 2,843,393 A | 7/1958 | Dahlander, Sr. | |
| 2,860,887 A | 11/1958 | Stewart | |
| 2,901,261 A | 8/1959 | Olvey | |
| 3,059,784 A | 10/1962 | Chamberlain et al. | |
| 3,193,123 A | 7/1965 | Wouden | |
| 3,241,852 A | 3/1966 | Muller et al. | |
| 3,545,786 A * | 12/1970 | Yoder | 280/47.24 |
| 3,785,669 A | 1/1974 | Doheny | |
| 4,465,423 A | 8/1984 | Anderson | |
| 4,705,179 A | 11/1987 | Lathrum | |
| 5,228,716 A | 7/1993 | Dahl | |
| D364,022 S | 11/1995 | Kazmark, Jr. | |
| 5,662,307 A | 9/1997 | Lentine | |
| 5,707,200 A | 1/1998 | Liu | |
| 6,123,345 A * | 9/2000 | Anderson | 280/47.27 |
| 6,523,838 B2 | 2/2003 | Richardson, IV | |
| 6,966,574 B1 | 11/2005 | Dahl | |
| 7,513,511 B2 * | 4/2009 | Chaseateau | 280/47.27 |
| 2005/0169736 A1 * | 8/2005 | Decky | 414/490 |
| 2008/0061523 A1 * | 3/2008 | Holand | 280/47.24 |
| 2010/0133207 A1 * | 6/2010 | Dolch et al. | 211/2 |
| 2010/0230450 A1 * | 9/2010 | Tomberli | 224/261 |

\* cited by examiner

*Primary Examiner* — John Walters
(74) *Attorney, Agent, or Firm* — Oyen Wiggs Green & Mutala LLP

(57) ABSTRACT

An outboard motor carrier comprises a frame, a motor support structure to which an outboard motor may be attached, and upper and lower wheels. The lower wheels are rotatably attached to a lower region of the frame so as to support the carrier when it is tilted from an upright standing position. The upper wheels are rotatably attached to an upper region of the frame so as to facilitate loading the carrier onto a bed of a vehicle and to support the carrier when in a reclined position. The motor support structure is attached to a mid region of the frame and may comprise a transverse mounting board. The lower region of the frame may operate as a stand when the carrier is an upright standing position. The carrier is configured to hold an attached outboard motor in a semi-upright position when it is in its reclined position.

29 Claims, 4 Drawing Sheets

OUTBOARD MOTOR CARRIER

TECHNICAL FIELD

This invention relates generally to hand-operated wheeled carriers such as trolleys, carts, hand-trucks and the like. In particular, this invention relates to such wheeled carriers configured to carry outboard motors used to propel small water-craft.

BACKGROUND

Outboard motors are a common propulsion system for boats, in particular smaller water-craft such as recreational motor boats, fishing boats and dinghies. Standard outboard motors are designed to be affixed to a transom or mounting board at the back of a boat and include an above-water engine or powerhead and a submersible propeller. Such outboard motors are generally detachable from a boat's transom so as to be transferred to another boat and/or stored when not in use (during the off-season for example). However, even smaller models of outboard motors in the range of 6 horsepower to 25 horsepower for example, can be too cumbersome and/or heavy for a single person to lift and carry safely or easily without assistance. Also, newer four-stroke outboard motors tend to be substantially heavier than their two-stroke counterparts. For example, a 6 horsepower two-stroke motor may weigh about 60 pounds while an equivalent four-stroke motor may weigh about 80 pounds. Likewise, 15 horsepower two-stroke and four-stroke motors may weigh approximately 80 and 115 pounds respectively and 25 horsepower two-stroke and four-stroke motors may weigh approximately 110 and 150 pounds respectively. These weights are too great for most people to lift.

There is therefore a need for apparatus to help carry and store outboard motors safely and easily when they are not attached to a boat. Furthermore, it is generally advisable to maintain an outboard motor in an upright or semi-upright position while being moved or stored, so that fluids such as crankcase oil or water do not leak into the cylinders of the engine. Such leaks may cause serious damage to the engine. In cases where a vehicle such as a pick-up truck is used to transport an outboard motor, there is a need to safely and easily load the outboard motor onto the carrying bed of the vehicle in such a way that the motor remains in a semi-upright position when loaded.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Aspects of this invention relate to innovative and improved designs of hand-operated wheeled carriers for outboard motors. Outboard motor carriers according to embodiments of this invention are configured, for example, to facilitate loading an attached outboard motor onto a carrying bed of a vehicle while maintaining the motor in a semi-upright position when loaded. Other aspects of this invention relate to methods of using such outboard motor carriers to load an attached outboard motor onto a carrying bed of a vehicle.

One aspect of the invention is directed to an outboard motor carrier comprising: a frame; a motor support structure to which an outboard motor may be attached; one or more lower wheels rotatably attached to a lower region of the frame; and one or more upper wheels rotatably attached to an upper region of the frame. The motor support structure is attached to a middle region of the frame and may comprise a transverse mounting board to which an outboard motor is attachable. The lower frame region may be operable as a stand when the carrier is an upright standing position on a level surface. The lower wheels, of which there are preferably two, are configured to support the carrier when it is tilted from its upright standing position. The upper wheels, of which there are preferably two, are configured to support the carrier along with the lower wheels when the carrier is in a reclined position on the level surface.

The mounting board is preferably oriented such that when the carrier is in the reclined position, the mounting board slants at an upward angle relative to the level surface. For example, this upward angle of the mounting board may be in the range of 20° to 40°. Also, the mounting board is preferably positioned such that when the carrier is in the reclined position, the upper edge of the mounting board is elevated a height above the level surface. For example, this height of the mounting board may be in the range of 10" to 14". In particular, the height of the mounting board and the upward angle of the mounting board may be configured to hold an attached outboard motor in a semi-upright position when the carrier is in the reclined position.

The upper frame region may be operable as a handle. In particular embodiments, the upper frame region comprises opposing side members and an upper handle extending transversely between the opposing side members. The upper wheels may be rotatably attached to ends of the upper handle extending transversely outward from the side members of the upper frame region. In some embodiments, the lower frame region comprises opposing side members and a lower handle extending transversely between the opposing side members. The outboard motor carrier may also comprise lower gussets extending between adjacent side members of the middle and lower frame regions.

The outboard motor carrier may further comprise a lower support bracket configured to engage a lower unit of an attached outboard motor. In particular embodiments, the lower support bracket comprises a rubber v-block. The lower support bracket may attach to a strut extending transversely between side members of the middle frame region nearer to the lower frame region than the motor support structure.

In some embodiments, an angle between a plane of the mounting board and the lower frame region is less than an angle between the middle and lower frame regions such that the mounting board has a rearward tilt relative to the middle frame region. This rearward tilt of the mounting board may be configured to align the lower unit of an attached outboard motor with the lower support bracket.

In preferred embodiments, the lower and upper frame regions angle away from the middle frame region in opposing directions. In such embodiments, the mounting board may extend transversely between opposing side members of the middle frame region. The angle between the middle and lower frame regions may be less than 90°. For example, the angle between the middle and lower frame regions is preferably in the range of 70° to 75°. The angle between the middle and upper frame regions may be greater than 90°.

In alternative embodiments, the motor support structure comprises one or more arms extending from the middle frame region and the mounting board is attached to the arms. In particular, the motor support structure may comprise two arms extending from the middle frame region and the mounting board may be attached transversely between ends of the arms.

In preferred embodiments, the upper frame region is configured to extend higher than an engine of an attached motor and the lower frame region is configured to extend further outward than a propeller of an attached motor when the carrier is in its upright standing position.

The invention is also directed to a method of lifting an outboard motor attached to an outboard motor carrier onto a bed of a truck. In this method the outboard motor carrier comprises a frame, a motor support structure to which an outboard motor may be attached, and upper and lower wheels, the lower wheels rotatably attached to a lower region of the frame so as to support the carrier when it is tilted forward from an upright standing position, and the upper wheels rotatably attached to an upper region of the frame so as to support the carrier when in a forwardly reclined position. The method comprises the following steps: from the upright standing position adjacent the bed of the truck, tilting the carrier forwardly on its lower wheels such that its upper wheels lie against the bed of the truck; lifting the carrier up by its lower frame region while a portion of the weight of the carrier and the attached motor are supported by the upper wheels on the bed of the truck; rolling the carrier along its upper wheels into the bed of the truck as the lower frame region is lifted; and, lifting the lower wheels onto the bed of the truck such that the carrier is entirely supported on the bed by its upper and lower wheels in its reclined position. The motor support structure may be configured relative to the frame to hold the attached outboard motor in a semi-upright position when the carrier is in the reclined position on the bed of the truck.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
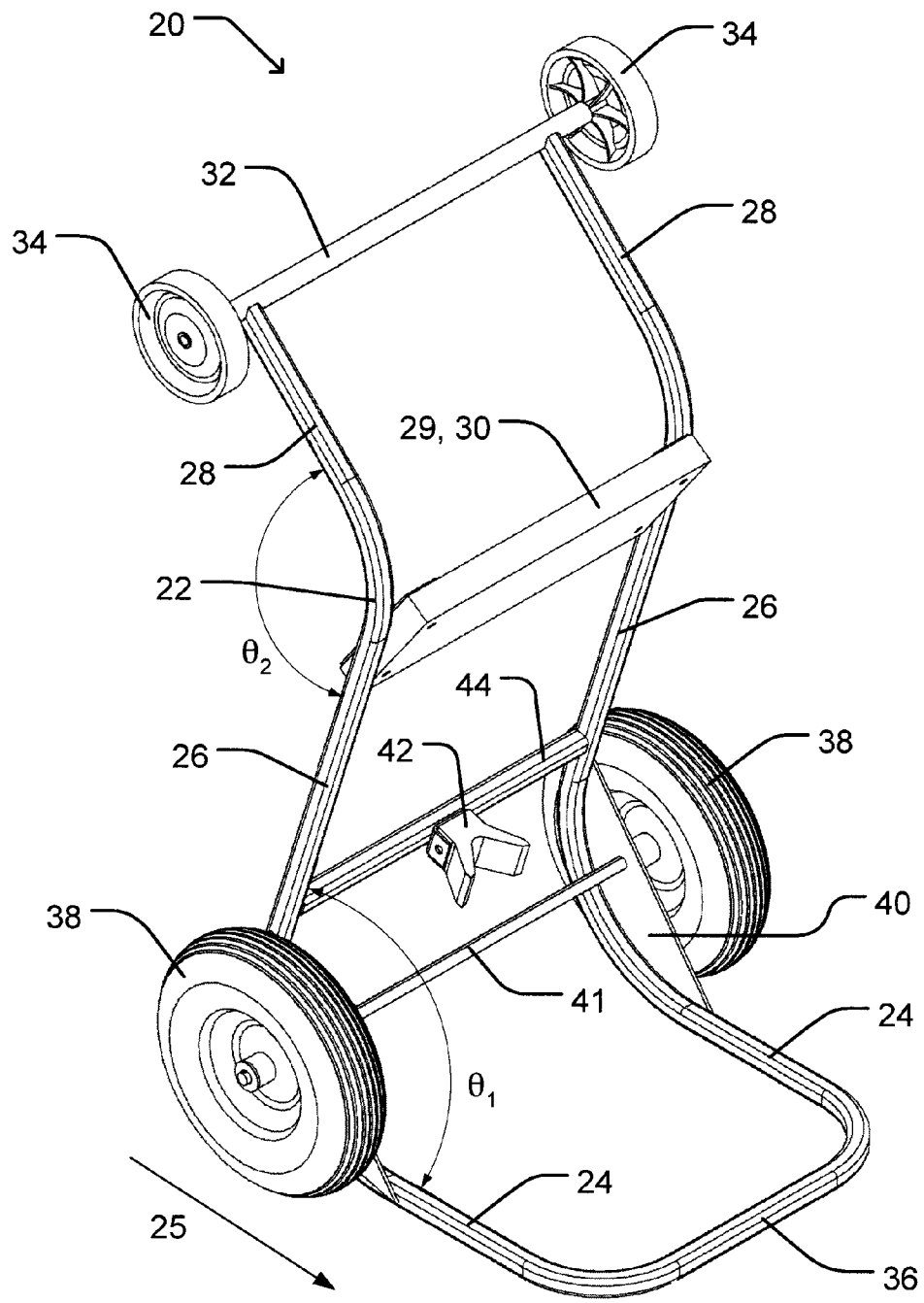
FIG. 1 is an isometric view of an outboard motor carrier according to an example embodiment of the present invention.

FIG. 1 illustrates an outboard motor carrier 20 according to an example embodiment of the present invention. Carrier 20 is configured to enable a person to store, move, lift onto a vehicle and transport by vehicle an outboard motor. Carrier 20 includes a frame 22. In some embodiments, as illustrated, frame 22 comprises a lower region 24, a middle region 26 and an upper region 28. Frame 22, and each region 24, 26, 28 thereof, may comprise two laterally spaced, substantially parallel side members.

In some embodiments, carrier 20 is configured to be self-standing in an upright position with or without an outboard motor attached. When carrier 20 is in such an upright standing position on level ground, as illustrated, lower frame region 24 may function as a stand, extending in a rearward direction (as indicated by arrow 25) substantially horizontally along the ground from a lower end of middle frame region 26. Lower frame region 24 may also serve to guard lower components of an attached motor, such as its propeller, from impact with walls or other objects when being wheeled rearward (in the direction indicated by arrow 25). If carrier 20 is tilted forward, lower frame region 24 may be pivoted off the ground allowing carrier 20 to roll along one or more lower wheels 38. Carrier 20 in use may be pulled in a forward direction (opposite the direction indicated by arrow 25) or pushed in a rearward direction. Carrier 20 may thus serve as an upright storage stand and a hand-operated moving cart.

When carrier 20 is in an upright position, middle frame region 26 extends upward from lower frame region 24 at an upward angle $\theta_1$ relative to lower frame region 24. In some embodiments, as illustrated, middle frame region 26 slants upward at an angle $\theta_1$ less than 90°. Such an angle may serve to maintain a center of gravity of carrier 20 over lower frame region 24 such that carrier 20 is self-standing in an upright position with or without an outboard motor attached. By way of non-limiting example, angle $\theta_1$ may be in the range of 60° to 80° and preferably is in the range of 70° to 75°.

When carrier 20 is in an upright position, upper frame region 28 may extend forwardly from an upper end of middle frame region 26 at an angle $\theta_2$ relative to middle frame region 26. In some embodiments (as better illustrated in FIG. 2A for example), angle $\theta_2$ is greater than 90° such that upper frame region 28 slants in semi-upward direction from middle frame region 26. Upper frame region 28 may operate as a handle when carrier 20 is in use. Upper frame region 28, or upper wheels 34 attached thereto, may be configured to extend higher than any part of an attached motor 50 when carrier 20 is in its upright standing position. In this manner, when carrier 20 is in a reclined position (as illustrated in FIG. 2B), upper frame region 28 and upper wheels 34 may serve to guard the attached motor from impact with a vertical surface 49 such as a wall or a side of the box of a pick-up truck. The forward slant of upper frame region 28 may also serve to protect forward facing controls of an attached motor 50, such as its gearshift, choke and throttle, so that, for example, they do not catch on the tailgate or bed of a vehicle when carrier 20 and motor 50 are loaded onto the bed of the vehicle.

Carrier 20 also includes a motor support structure 29 attached to frame 22 to which an outboard motor may be clamped or otherwise attached. In some embodiments, motor support structure 29 comprises a transverse mounting board 30 configured to be engaged by a mounting bracket of a typical outboard motor. As illustrated, mounting board 30 may extend between the side members of middle frame region 26.

Mounting board 30 may be aligned to be co-planar with middle frame region 26 or may be tilted relative to middle frame region 26. In the illustrated embodiment, mounting board 30 has a rearward tilt relative to middle frame region 26 such that an angle between a plane of the mounting board and lower frame region is less than angle $\theta_1$ between the middle and lower frame regions. Such rearward tilt of mounting board 30 may serve to hold a mounted outboard motor at a semi-upright angle when carrier 20 is in a reclined position as described further below. Such rearward tilt of mounting board 30 may also serve to align the lower unit of an attached motor with a lower support bracket of carrier 20 as described further below. In some embodiments, the tilt of mounting board 30 relative to middle frame region 26 is adjustable.

Carrier 20 may have one or more upper wheels 34 rotatably attached to its upper frame region 28. In preferred embodiments, carrier 20 has at least two upper wheels 34 as illustrated. One central upper wheel is a possibility if, for example, the wheel has a wide track design to provide lateral stability. In some embodiments, upper wheels 34 are configured such that when carrier 20 is tilted forwardly onto the ground (herein referred to as its reclined position as illustrated for example in FIG. 2B) or tilted forwardly against a raised surface (as illustrated for example in FIG. 3A), the upper wheels 34 make contact with the ground or raised surface and support a portion of the weight of carrier 20. In particular, when carrier 20 is in its reclined position on the ground (as illustrated for example in FIG. 2B), it may be entirely supported by its upper and lower wheels 34, 38. Upper wheels 34 may serve, for example, to facilitate lifting carrier 20 onto a bed of a vehicle as described further below. Upper wheels 34 may be any type of rolling means. By way of non-limiting example, in some embodiments, upper wheels 34 are 6" diameter wheels comprising rubber treads on plastic hubs.

As shown in the illustrated embodiment, carrier 20 may have an upper handle 32 extending transversely between the side members of upper frame region 28. A person may grip upper handle 32 in order to tilt carrier 20 forwardly and roll carrier 20 along its lower wheels 38. In some embodiments, the ends of upper handle 32 extend outwardly from each side member of upper frame region 28 and upper wheels 34 are attached to each end of upper handle 32.

In the illustrated embodiment, carrier 20 also has a lower handle 36 extending transversely between side members of lower frame region 24 at or near a rearward end of lower frame region 24. A person may grip lower handle 36 in order to roll carrier 20 when it is in a reclined position as illustrated in FIG. 2B. A person may also use lower handle 36 in order to lift carrier 20 up off the ground, for example when carrier 20 is leaning against a bed of a truck as described below. Lower handle 36 may also serve to guard a propeller of a mounted outboard motor from impact with an object when carrier 20 is being rolled rearwardly, as mentioned above.

As mentioned above, carrier 20 may be equipped with one or more lower wheels 38 for rolling carrier 20 when it is tilted forwardly. In preferred embodiments, as illustrated, carrier 20 has two lower wheels 38, one attached adjacent to each side of frame 22. One central lower wheel is a possibility if, for example, the wheel has a wide track design to provide lateral stability. Lower wheels 38 may be configured to allow carrier 20 to roll easily over a variety of unfinished surfaces such as, for example, sand and gravel. By way of non-limiting example, in some embodiments, lower wheels are pneumatic or solid rubber tires having a diameter in the range of 10"-13" for easy transport over uneven surfaces.

In the illustrated embodiment, lower gussets 40 extend across the angle between lower and middle frame regions 24, 26. Lower gussets 40 may be used to strengthen the angle between lower and middle frame regions 24, 26 and thereby provide additional structural support to carrier 20. Lower gussets 40 may also provide attachment points for lower wheels 38. Carrier 20 may also comprise upper gussets (not shown) to support an angle between upper and middle frame regions 28, 26.

In some embodiments, a lower axle 41 extends between lower wheels 38. For example, in the illustrated embodiment, lower wheels 38 attach to each end of lower axle 41. Lower axle 41 may extend through and be supported by gussets 40. In other embodiments, lower wheels 38 are rotatably attached to carrier 20 without use of an axle. A benefit of connecting lower wheels 38 to a lower axle 41, as illustrated, is that lower axle 41 assists in maintaining alignment between lower wheels 38. Lower axle 41 is preferably positioned relative to mounting board 30 so as to avoid interfering with the lower unit of an attached outboard motor.

Carrier 20 may have one or more struts 44 extending transversely between side members of frame 22. In the embodiment shown in FIG. 1, carrier 20 has a strut 44 extending transversely between side members of middle frame region 26 positioned between the lower end of middle frame region 26 and mounting board 30. Struts 44 provide additional structural support to carrier 20.

Carrier 20 may have a lower support bracket 42, such as a rubber v-block, configured to engage the leg or lower unit of an attached outboard motor. As illustrated in FIG. 1, lower support bracket 42 may be attached to strut 44. In preferred embodiments, the tilt of mounting board 30 and the positioning of lower support bracket 42 relative to mounting board 30 are configured such that the lower unit of an attached outboard motor aligns with lower support bracket 42. Lower support bracket 42 may have a shape designed to match that of the lower unit of an outboard motor (opposite its propeller). In some embodiments, as illustrated, lower support bracket 42 is notched or v-shaped and made of resilient rubber. Lower support bracket 42 may thus help prevent an attached outboard motor from shifting or bouncing when carrier 20 is in motion, in particular when carrier 20 is transported in its reclined position (on the bed of a truck for example). The lower unit of an outboard motor may be further secured to lower support bracket 42 by a strap or any other suitable retaining means.

In some embodiments, frame 22 is made of steel tubing. For example, frame 22 may be constructed from hollow structural section (HSS) steel tubing of various cross-sectional shapes, dimensions and thicknesses. Frame 22 may be constructed from circular, rectangular or square HSS. By way of non-limiting example, in some embodiments, frame 22 is made from 1"×1" square HSS having a wall thickness of 0.063 to 0.100". In some embodiments, upper handle 32, lower handle 36 and/or strut 44 are made from the same type of steel tubing as frame 22. In some embodiments, frame 22 has a substantially constant width of approximately 28.5" allowing it to fit through standard sized 30" doorways. Carrier 20 may be configured to support outboard motors of various sizes and weights. For example, in some embodiments carrier 20 is configured to support motors having a weight up to 150 pounds.

Figure 2A:
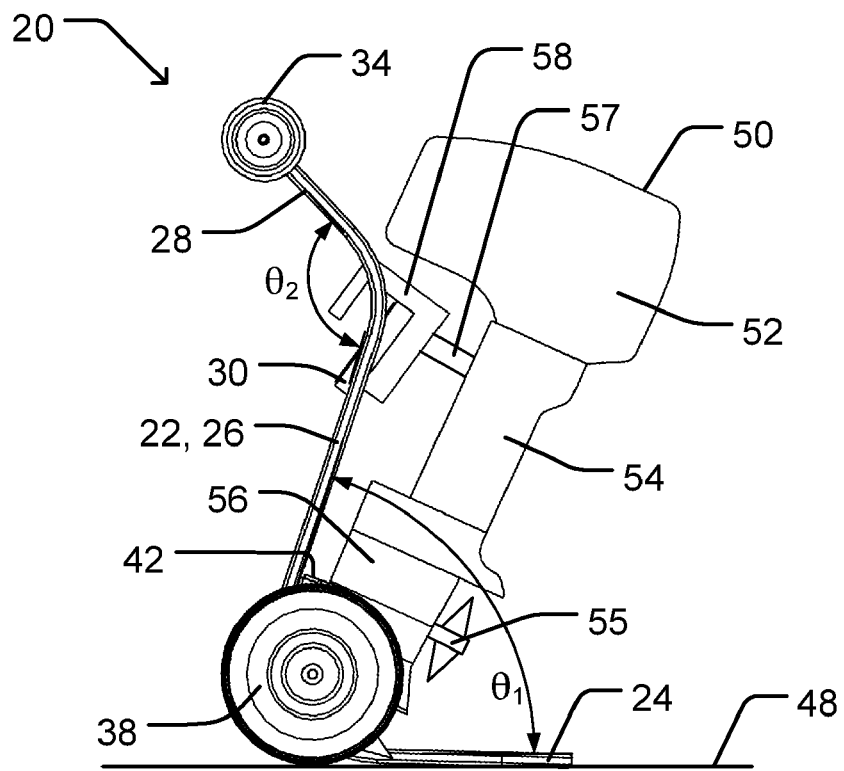
FIG. 2A is a side elevation view of the outboard motor carrier shown in FIG. 1 in an upright standing position with an outboard motor attached.
Figure 2B:
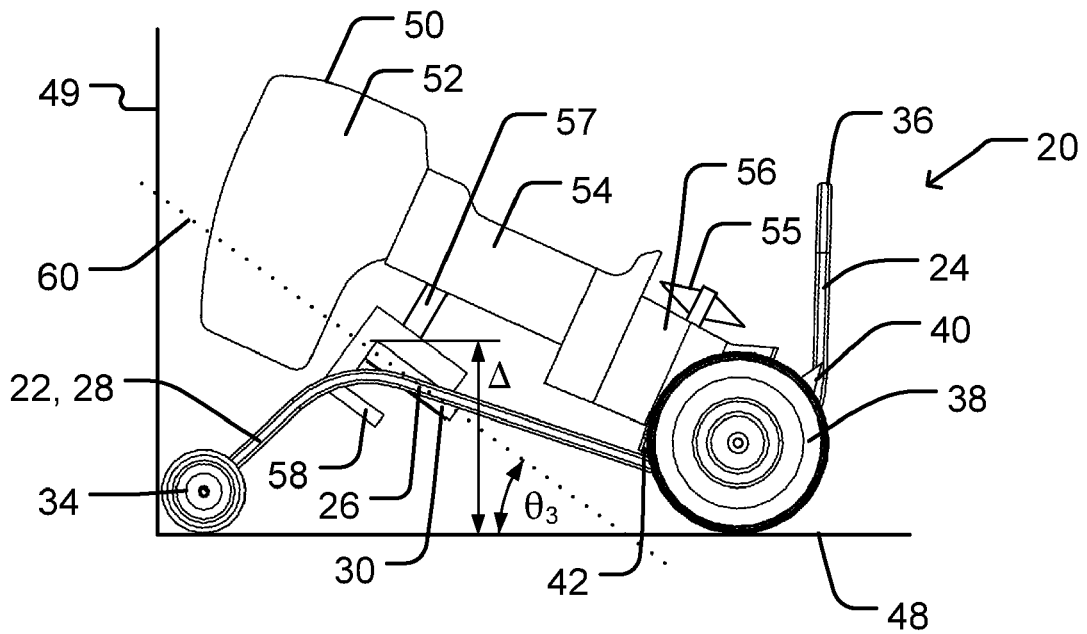
FIG. 2B is a side elevation view of the outboard motor carrier shown in FIG. 1 in a reclined position with an outboard motor attached.

FIGS. 2A and 2B show carrier 20 holding an attached outboard motor 50 in an upright standing position and in a reclined position respectively, according to example embodiments of the invention. Outboard motor 50 is depicted in a simplified schematic form for the sake of clarity. Outboard motor 50 comprises an engine 52 (also known as a powerhead), a mid-section 54 and a lower unit 56. A propeller 55 rotatably attaches to lower unit 56. A conventional mounting bracket 58 is connected to motor 50 by an attachment assembly 57. As illustrated, mounting bracket 58 of motor 50 fits over mounting board 30 of carrier 20. Mounting bracket 58 may be affixed to mounting board 30 by various means such as by clamps or bolts (not shown) in the same way it would be affixed to the transom of a boat.

In FIG. 2A, carrier 20 is shown standing on a generally level surface 48 such as the ground. Lower frame region 24 lies along level surface 48 and thereby supports carrier 20 in its self-standing upright position with or without an outboard motor attached. In this position, lower frame region 24 may also provide sufficient friction against level surface 48 to prevent carrier 20 from easily rolling away along lower wheels 38. When carrier 20 is tilted forward from its upright standing position (by pulling on upper handle 32 for example), lower frame region 24 is raised up off level surface 48 allowing the carrier roll along lower wheels 38.

Figure 3A:
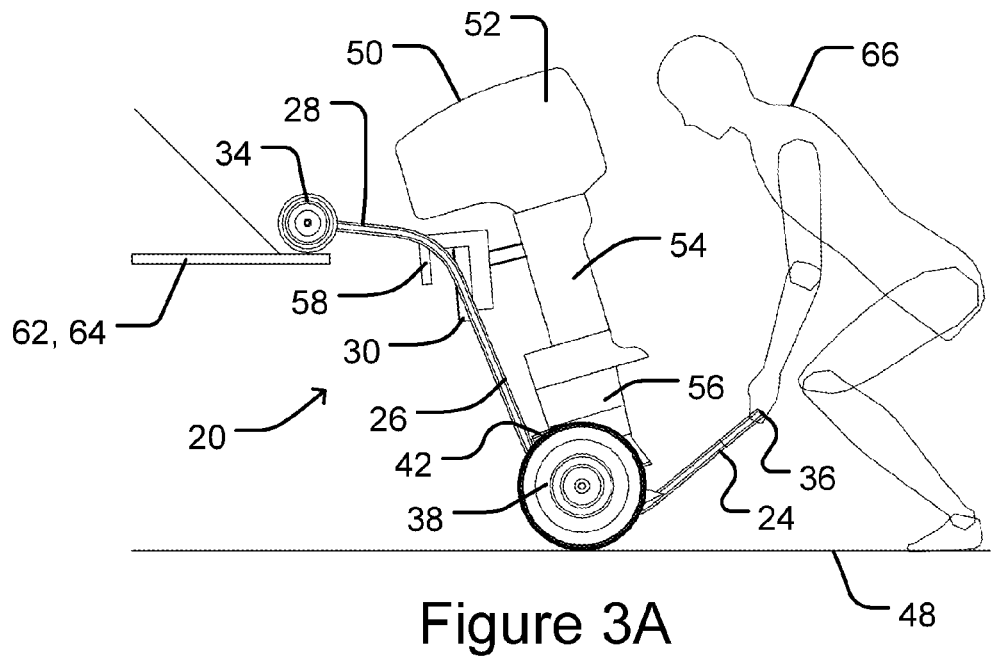
FIG. 3A is a side elevation view of the outboard motor carrier shown in FIG. 1 with an outboard motor attached in position to be lifted onto a bed of a truck.
Figure 3B:
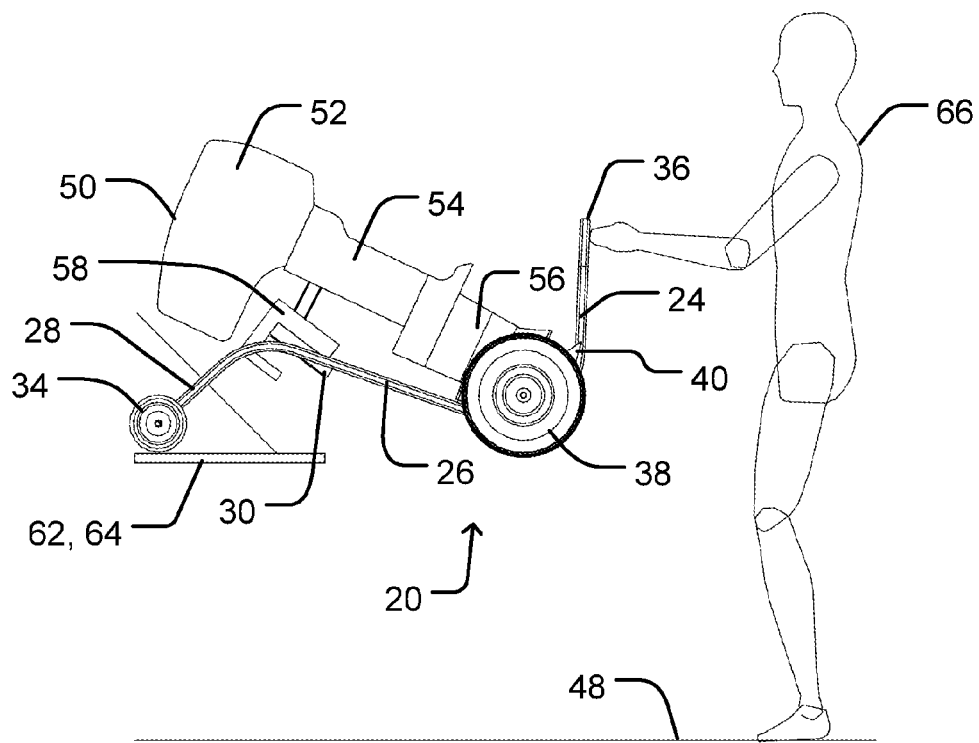
FIG. 3B is a side elevation view of the outboard motor carrier shown in FIG. 1 with an outboard motor attached partially lifted onto a bed of a truck.

FIG. 2B shows carrier 20, with an outboard motor 50 attached, in its reclined position with its upper and lower wheels 34, 38 lying on level surface 48. Carrier 20 may be moved to this position from its upright position shown in FIG. 2A by tilting carrier 20 forwardly until upper wheels 34 rest against level surface 48. Carrier 20 may also be placed in its reclined position when lifted onto the carrying bed of a vehicle for transport as illustrated in FIGS. 3A and 3B and discussed further below.

When in the reclined position, lower frame region 24 extends substantially vertically upward and lower handle 36 may be used to pull or push carrier 20 along level surface 48. The positioning of upper wheels 34 may serve to protect the top of engine 52 when carrier 20 is rolled against a vertical surface 49 as illustrated. Carrier 20 may be prevented from rolling in its reclined position by placing blocks (not shown) against upper wheels 34 and/or lower wheels 38 or implementing any other suitable braking mechanism. Some embodiments of the present invention include a suitable braking mechanism that may be manually engaged to brake upper wheels 34 and/or lower wheels 38 as needed. Such braking systems are available on the market.

The shape of frame 22, together with the position and tilt of mounting board 30, may be configured such that motor 50 is held in a semi-upright position when carrier 20 is lying in its reclined position on a level surface 48. In this semi-upright position, engine 52 of motor 50 is elevated higher than lower unit 56, and thus fluids in lower unit 56 are prevented from leaking into engine 52. If motor 50 is not maintained in a semi-upright position, then, for example, crankcase oil (in four-stroke motors) may leak into the cylinders of engine 52. In two or four-stroke motors, undrained water may leak into the cylinders if the motor is not maintained in a semi-upright position. Such leakage of fluids into the cylinders may cause significant damage to engine 52.

As shown in FIG. 2B, when carrier 20 is in its reclined position, a plane 60 of mounting board 30 forms an upward angle $\theta_3$ with level surface 48. Upward angle $\theta_3$ may be determined by the rearward tilt of motor board 30 relative to middle frame region 26 and the upward incline of middle frame region 26 relative to level surface 48 (which may be dependent on many factors including the length of middle and upper frame regions 26, 28, the angle $\theta_2$ between middle and upper frame regions and the radius of upper and lower wheels, 34, 38). By way of non-limiting example, in some embodiments, upward angle $\theta_3$ is in the range of 20° to 40°.

As well, when carrier 20 is in its reclined position as illustrated, an upper edge of mounting board 30 is elevated off level surface 48 by a height Δ. Height Δ may be configured to provide a desired clearance between the components of an attached motor 50, such as its lower unit 56 and throttle control (not shown), and level surface 48. By way of non-limiting example, height Δ may be in the range of 6" to 18" and preferably is in the range of 10" to 14".

Carrier 20 may be used to facilitate loading an attached motor 50 onto the load bed of a vehicle and transporting motor 50 by vehicle. FIGS. 3A and 3B illustrate the steps of a method by which a person 66 may load carrier 20 and motor 50 onto the open tailgate 62 of a pick-up truck 64 according to an example embodiment of the present invention. An initial step of this method is to position carrier 20 by tailgate 62 such that upper handle 32 and upper wheels 34 extend over or nearly over tailgate 62. Carrier 20 may then be tilted forward until upper wheels 34 rest against tailgate 62 as illustrated in FIG. 3A.

While upper wheels 34 are supported by tailgate 62, carrier 20 is lifted up off the ground 48 using lower handle 36 as illustrated in FIG. 3B. Outboard motors are typically top-heavy due to the engine 52 being the heaviest component, and thus much of the weight of motor 50 may be supported by tailgate 62 rather than person 66 when carrier 20 is lifted by person 66. For example, because of the load distribution, person 66 may lift only half the weight of motor 50 or less.

As lower frame region 24 of carrier 20 is lifted up, carrier 20 may be pushed forward onto the bed of the pick-up truck 64 along upper wheels 34. Upper wheels 34 may be rolled across tail-gate 62 and into the bed of pick-up truck 64. As lower wheels 38 are lifted to the level of tailgate 62 they may be rolled onto tailgate 62 as well, such that carrier 20 is entirely supported on the bed and tail-gate 62 of pick-up truck 64. Carrier 20 is then in its reclined position and may be rolled in this position further onto the bed of pick-truck 64 until tailgate 62 can be closed.

The above method may be used to lift carrier 20 into any suitably spacious vehicle bed, trunk space or the like, or onto any raised surface in general that is not higher than upper wheels 34 of carrier 20.

Once loaded on a vehicle such as a pick-up truck, carrier 20 holds attached motor 50 in a safe and secure position for transport. The shape of frame 22 and the tilt of mounting board 30 maintain the motor in a semi-upright position as described above. Lower support bracket 42 may be used to securely hold lower unit 56 of motor 50 onto carrier 20 so that motor 50 does not shift or bounce during transport. In some embodiments, upper frame region 28 and upper wheels 34 extend beyond the top of motor 50 and thus protect the top of motor 50 from damage during transport when carrier 20 is in its reclined position. Also, the shape of frame 22 can serve to create sufficient clearance between engine 52 and the tailgate and bed of truck 64 such that the motor's gearshift, choke, throttle and other controls do not catch on the tailgate or bed of the truck during the loading process.

Carrier 20 may be unloaded from a vehicle such as a pick-up truck by performing the above steps in reverse. Thus, carrier 20 may be used to wheel an outboard motor from a boat to a vehicle, load the motor on the vehicle, secure the motor in a semi-upright position while in transit by vehicle, unload the motor from the vehicle and wheel the motor to its intended destination.

Figure 4A:
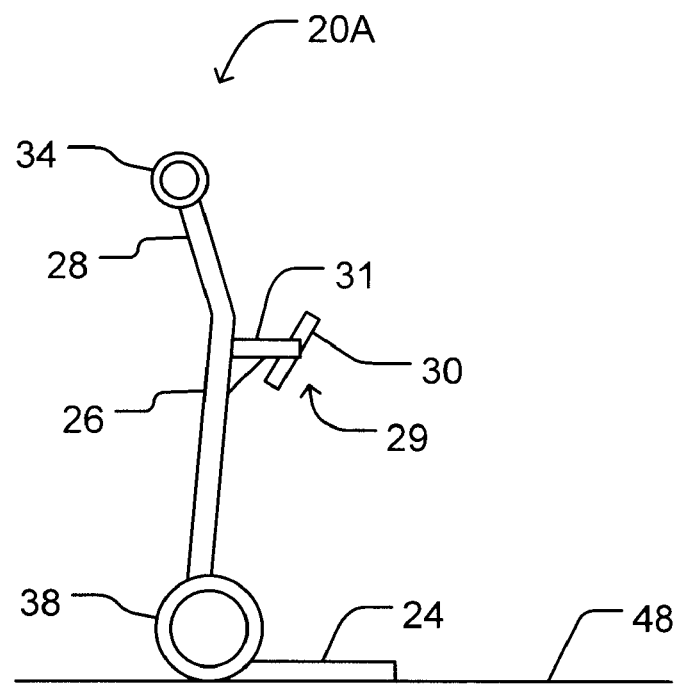
FIG. 4A is a side elevation view of an outboard motor carrier in an upright standing position according to another example embodiment of the present invention.

FIG. 4A illustrates an alternative embodiment of an outboard motor carrier 20A in an upright standing position on a level surface 48. In this embodiment, motor support structure 29 comprises arms 31 that extend rearwardly from middle frame region 26 and mounting board 30 is attached to arms 31. Motor support structure 29 is configured to support the weight of an outboard motor against frame 22 when the motor is attached to mounting board 30. As illustrated, mounting board 30 of motor support structure 29 is configured to have a rearward tilt relative to middle frame region 26.

Figure 4B:
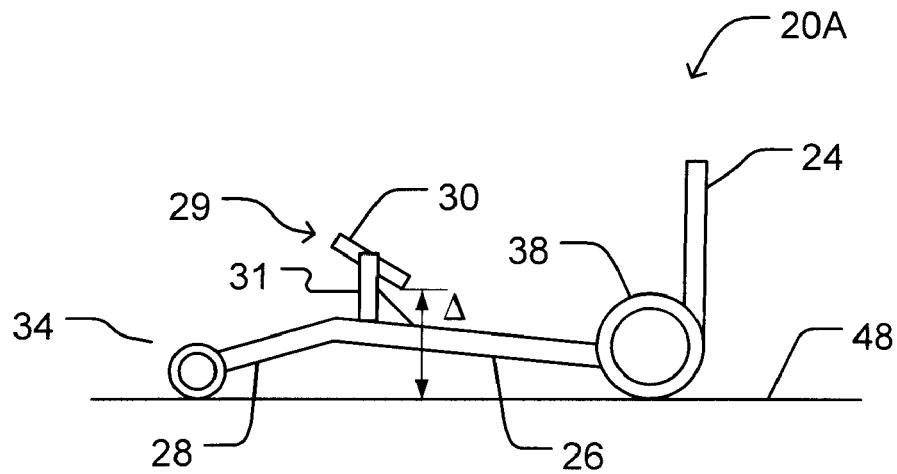
FIG. 4B is a side elevation view of the outboard motor carrier shown in FIG. 4A in a reclined position.

FIG. 4B illustrates carrier 20A in a reclined position on level surface 48. In this position, the upper edge of motor board 30 is elevated a height Δ above level surface 48 that is proportional to a length of arms 31. As well, motor board 30 is oriented at an upward angle relative to level surface 48 that is proportional to its rearward tilt relative to middle frame region 26. The rearward tilt of motor board 30 and the length of arms 31 may be configured such that a motor attached to carrier 20A is held in a semi-upright position when carrier 20A is in its reclined position.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An outboard motor carrier comprising:
a frame;
a motor support structure to which an outboard motor may be attached, the motor support structure attached to a middle region of the frame;
one or more lower wheels rotatably attached to a lower region of the frame; and
one or more upper wheels rotatably attached to an upper region of the frame;
wherein the motor support structure comprises a transverse mounting board to which an outboard motor may be attached; and
wherein the mounting board is oriented such that when the carrier is in a reclined position the mounting board slants at an upward angle relative to a level surface.

2. An outboard motor carrier according to claim 1 wherein the lower frame region is operable as a stand when the carrier is in an upright standing position on the level surface.

3. An outboard motor carrier according to claim 2 wherein there are two lower wheels which are configured to support the carrier when the carrier is tilted from the upright standing position.

4. An outboard motor carrier according to claim 3 wherein there are two upper wheels which are configured to support the carrier when the carrier is in the reclined position on the level surface.

5. An outboard motor carrier according to claim 1 wherein the upward angle of the mounting board is in the range of 20° to 40°.

6. An outboard motor carrier according to claim 1 wherein the mounting board is positioned such that when the carrier is in the reclined position an upper edge of the mounting board is elevated a height above the level surface.

7. An outboard motor carrier according to claim 6 wherein the height of the upper edge of the mounting board is in the range of 10" to 14".

8. An outboard motor carrier according to claim 6 wherein the height of the mounting board and the upward angle of the mounting board are configured to hold an attached outboard motor in a semi-upright position when the carrier is in the reclined position.

9. An outboard motor carrier according to claim 8 wherein the upper frame region is operable as a handle.

10. An outboard motor carrier according to claim 9 wherein the upper frame region comprises opposing side members and an upper handle extending transversely between the opposing side members.

11. An outboard motor carrier according to claim 10 wherein the upper wheels are rotatably attached to ends of the upper handle extending transversely outward from the side members of the upper frame region.

12. An outboard motor carrier according to claim 8 wherein the lower frame region comprises opposing side members and a lower handle extending transversely between the opposing side members.

13. An outboard motor carrier according to claim 8 comprising a lower support bracket configured to engage a lower unit of the attached outboard motor.

14. An outboard motor carrier according to claim 13 wherein the lower support bracket comprises a rubber v-block.

15. An outboard motor carrier according to claim 13 wherein the lower support bracket attaches to a strut extending transversely between side members of the middle frame region nearer to the lower frame region than the motor support structure.

16. An outboard motor carrier according to claim 13 wherein an angle between a plane of the mounting board and the lower frame region is less than an angle between the middle and lower frame regions such that the mounting board has a rearward tilt relative to the middle frame region.

17. An outboard motor carrier according to claim 16 wherein the rearward tilt of the mounting board is configured to align the lower unit of the attached outboard motor with the lower support bracket.

18. An outboard motor carrier according to claim 8 comprising lower gussets extending between adjacent side members of the middle and lower frame regions.

19. An outboard motor carrier according to claim 8 wherein the lower and upper frame regions angle away from the middle frame region in opposing directions.

20. An outboard motor carrier according to claim 19 wherein the mounting board extends transversely between opposing side members of the middle frame region.

21. An outboard motor carrier according to claim 20 wherein the angle between the middle and lower frame regions is less than 90°.

22. An outboard motor carrier according to claim 21 wherein the angle between the middle and lower frame regions is in the range of 70° to 75°.

23. An outboard motor carrier according to claim 21 wherein the angle between the middle and upper frame regions is greater than 90°.

24. An outboard motor carrier according to claim 8 wherein the motor support structure comprises one or more arms extending from the middle frame region and the mounting board is attached to the arms.

25. An outboard motor carrier according to claim 24 wherein the motor support structure comprises two arms extending from the middle frame region and the mounting board is attached transversely between ends of the arms.

26. An outboard motor carrier according to claim 8 wherein the upper frame region is configured to extend higher than an engine of the attached motor when the carrier is in an upright standing position.

27. An outboard motor carrier according to claim 8 wherein the lower frame region is configured to extend further outward than a propeller of the attached motor when the carrier is in an upright standing position.

28. An outboard motor carrier according to claim 8 wherein the upper frame region is configured to extend beyond an engine of the attached motor when the carrier is in the reclined position.

29. A method of lifting an outboard motor attached to an outboard motor carrier onto a bed of a truck, the carrier comprising a frame, a motor support structure to which an outboard motor may be attached, and upper and lower wheels, the lower wheels rotatably attached to a lower region of the frame so as to support the carrier when the carrier is tilted forward from an upright standing position, the upper wheels rotatably attached to an upper region of the frame so as to support the carrier when in a forwardly reclined position, the method comprising:

from the upright standing position adjacent the bed of the truck, tilting the carrier forwardly on the lower wheels such that the upper wheels lie against the bed of the truck;

lifting the carrier up by the lower frame region while a portion of a weight of the carrier and the attached motor are supported by the upper wheels on the bed of the truck;

rolling the carrier along the upper wheels into the bed of the truck as the lower frame region is lifted; and, lifting the lower wheels onto the bed of the truck such that the carrier is entirely supported on the bed by the upper and lower wheels in the reclined position, wherein the motor support structure is configured relative to the frame to hold the attached outboard motor in a semi-upright position when the carrier is in the reclined position on the bed of the truck.

* * * * *